(12) United States Patent
Sunata

(10) Patent No.: US 7,251,774 B2
(45) Date of Patent: Jul. 31, 2007

(54) SYSTEM FOR DESCRIBING MARKUP LANGUAGE FOR MOBILE USE, AND INFORMATION PROCESSING APPARATUS AND PROGRAM FOR GENERATING DISPLAY CONTENT

(75) Inventor: Jin Sunata, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 420 days.

(21) Appl. No.: 10/385,459

(22) Filed: Mar. 12, 2003

(65) Prior Publication Data

US 2003/0177445 A1    Sep. 18, 2003

(30) Foreign Application Priority Data

Mar. 13, 2002    (JP) .............................. 2002-068297

(51) Int. Cl.
G06F 15/00 (2006.01)
G06F 17/00 (2006.01)

(52) U.S. Cl. .............................. 715/500.1; 715/501.1; 455/566

(58) Field of Classification Search ............. 715/500.1, 715/501.1; 455/566
See application file for complete search history.

(56) References Cited

U.S. PATENT DOCUMENTS

| | | | |
|---|---|---|---|
| 4,366,475 A | 12/1982 | Kishi et al. ................. | 345/688 |
| 4,991,121 A | 2/1991 | Minoura et al. ............. | 345/1.1 |
| 5,010,324 A | 4/1991 | Yamamoto ................... | 345/684 |
| 5,880,740 A * | 3/1999 | Halliday et al. ............ | 345/629 |
| 6,288,800 B1 | 9/2001 | Izumi ......................... | 358/468 |
| 6,351,599 B1 | 2/2002 | Komeno ...................... | 345/721 |
| 6,674,439 B1 | 1/2004 | Shin et al. .................. | 345/501 |
| 6,684,087 B1 * | 1/2004 | Yu et al. ..................... | 455/566 |
| 6,714,205 B1 | 3/2004 | Miyashita et al. .......... | 345/536 |
| 2002/0032699 A1 * | 3/2002 | Edwards et al. ............ | 707/513 |
| 2003/0040341 A1 * | 2/2003 | Casais ........................ | 455/566 |
| 2003/0077002 A1 | 4/2003 | Silverstein et al. ......... | 382/298 |
| 2003/0123744 A1 | 7/2003 | Chui et al. .................. | 382/240 |
| 2003/0135649 A1 | 7/2003 | Buckley et al. ............. | 345/864 |

FOREIGN PATENT DOCUMENTS

| | | |
|---|---|---|
| EP | 0833492 | 4/1998 |
| JP | 2001-45407 | 2/2001 |
| JP | 2001-52154 | 2/2001 |
| JP | 2002-335570 | 11/2002 |

OTHER PUBLICATIONS

Internet services on enhanced CDPD systems, A. Jauregui et al., Computers and Communications, 1999, Proceedings. IEEE International Symposium on Jul. 6-8, 1999 pp. 87-92.*

* cited by examiner

Primary Examiner—William Bashore
(74) Attorney, Agent, or Firm—Fitzpatrick, Cella, Harper & Scinto

(57) ABSTRACT

A partial image to be displayed is extracted from an original image. The partial image is displayed along with information, such as a radar display, that indicates which part of the original image is being displayed.

9 Claims, 10 Drawing Sheets

```
<HTML>
<HEAD>
<META http-equiv= "Content-Type" content= "text/html;charset=Shift_JIS" >
<TITLE> </TITLE>
</HEAD>
<A href= "link information" accesskey= "3" >key 3:upper right </A>
</BODY>
</HTML>
```

RELATIONSHIP BETWEEN ACCESSKEY ATTRIBUTE IN HTML AND TEN-KEYS

NETWORK CONFIGURATION

MOBILE PHONE AND TEN-KEY UNIT

RELATIONSHIP BETWEEN ACCESSKEY ATTRIBUTE IN HTML AND TEN-KEYS

ENLARGED DISPLAY OF IMAGE

RADAR IMAGE INDICATING ENLARGED PART

| RADAR IMAGE | TEN-KEYS FOR SELECTION OPERATION | NOTE |
|---|---|---|
| 26-1  | 2 to 9 | WHOLE IMAGE IS DISPLAYED IF KEY CORRESPONDING CURRENTLY DISPLAYED ENLARGED IMAGE IS PRESSED |
| 26-2  | 1 AND 3 to 9 | |
| 26-3  | 1, 2 AND 4 to 9 | |
| 26-4  | 1 to 3 AND 5 to 9 | |
| 26-5  | 1 to 4 AND 6 to 9 | |
| 26-6  | 1 to 5 AND 7 to 9 | |
| 26-7  | 1 to 6, 8 AND 9 | |
| 26-8  | 1 to 7 AND 9 | |
| 26-9  | 1 to 8 | |

RELATIONSHIPS BETWEEN RADAR IMAGES AND TEN-KEYS

CONFIGURATION OF WEB SERVER COMPONENTS

SYSTEM FOR DESCRIBING MARKUP LANGUAGE FOR MOBILE USE, AND INFORMATION PROCESSING APPARATUS AND PROGRAM FOR GENERATING DISPLAY CONTENT

FIELD OF THE INVENTION

This invention relates to a system for describing a markup language for mobile use, and an information processing apparatus and program for generating a display content.

BACKGROUND OF THE INVENTION

Today the Internet can be used through mobile phones.

Some browsers installed in commercially available mobile phones adopt HTML for mobile devices called COMPACT-HTML (COMPACT-HyperText Markup Language) established by W3C (World Wide Web Consortium), which establishes standards for the Internet.

In COMPACT-HTML, a ten-key number called an access key may be assigned to a link tag in HTML so that the link can be designated by a ten-key of the mobile phone. Designating a ten-key number allows jumping to a specific link in one key operation and eliminates the efforts to move a cursor key to a link position and to select the link with an OK button.

When an image display service is provided for a small information device such as a mobile phone having a COMPACT-HTML browser, a server has to reduce the size of an image to the mobile phone's display size and send the reduced image to the mobile phone.

However, the image reduced for display on a small display unit of the mobile phone may be hard to view due to the size reduction. Further, when a part of the image is interested in, the server has to generate an enlarged version of the whole image for enlarged display and send it to the mobile phone. Furthermore, the mobile phone has to again receive the whole image for enlarged display in order to display only a part of the image. This involves problems in various aspects, such as the time required for reception, a communication charge, communication resources, and memory resources, for the user who has to receive the whole enlarged image from the server although he wants to enlarge only a part of the image.

To solve these problems, it may be contemplated to specify the part to be enlarged and cause the server to enlarge only that part and send it to the mobile phone. However, the problems are that there is no way to specify the part to be enlarged, and that if the part is actually enlarged and displayed, it is hard to know which part of the original whole image is being displayed.

SUMMARY OF THE INVENTION

An object of the invention is to facilitate knowing which part of an original image is being displayed as a partial image.

Another object of the invention is to enhance usability in an image display in terms of a position sensation.

To realize these objects, according to an aspect of the present invention, an apparatus for generating image data comprising selection means for selecting a part of a first image based on an operated key in ten-keys; and generation means for generating image data, the image data including the selected part of the first image and a second image indicating a position of the operated key.

According to another aspect of the present invention, a method for generating image data comprising the steps of selecting a part of a first image based on an operated key in ten-keys; and generating image data, the image data including the selected part of the first image and a second image indicating a position of the operated key.

According to another aspect of the present invention, a program for generating image data comprising the steps of selecting a part of a first image based on an operated key in ten-keys; and generating image data, the image data including the selected part of the first image and a second image indicating a position of the operated key.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Now, embodiments of the invention will be described with reference to the drawings.

Figure 1:
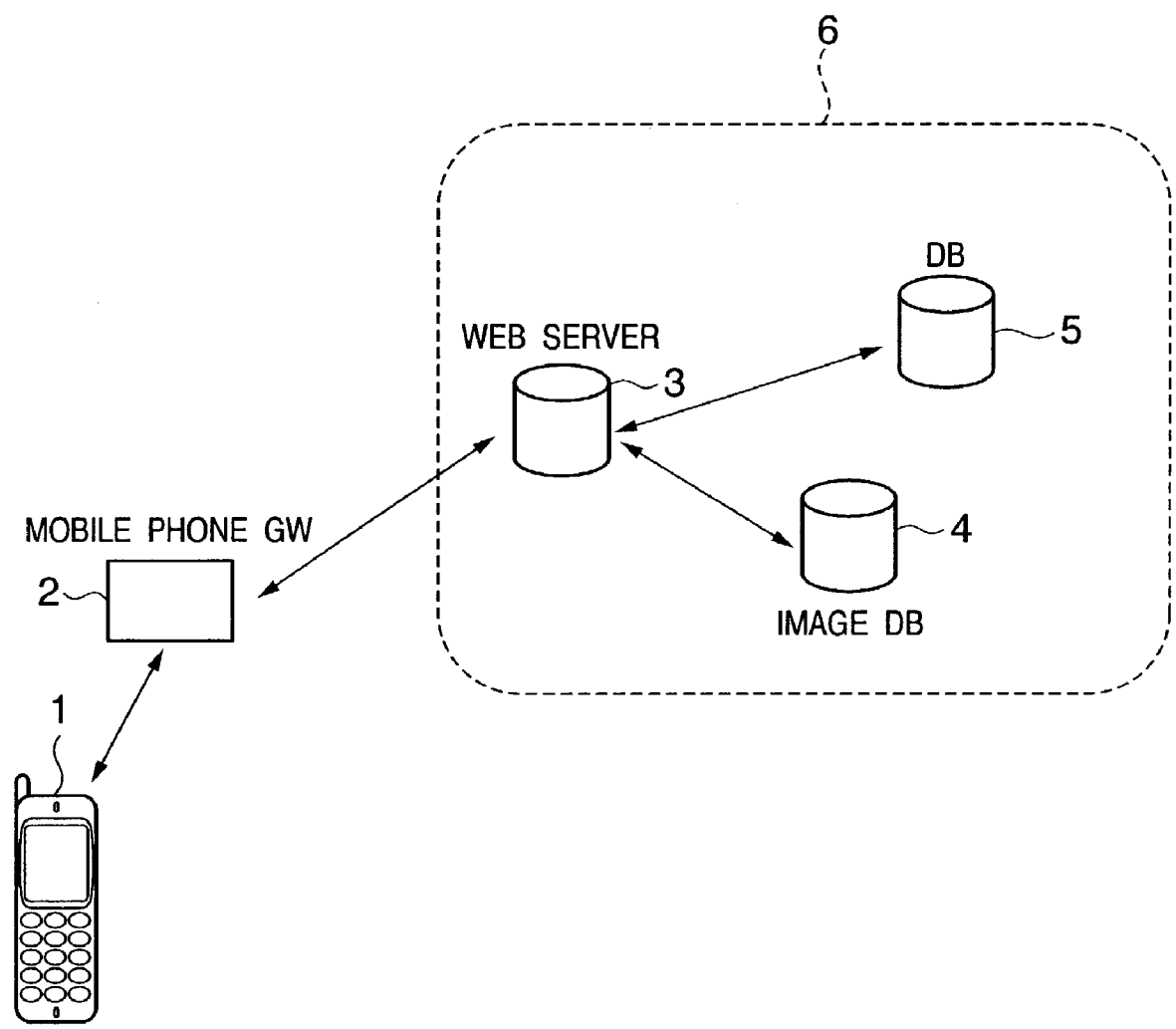
FIG. 1 shows a network configuration for describing an embodiment of the invention.

FIG. 1 is an overview of a network configuration adapted for describing the embodiment of the present invention.

In FIG. 1, the network is configured such that a mobile phone 1 can cooperate with a mobile phone gateway (referred to as a mobile phone GW hereafter) 2 to connect to a web service system 6. The mobile phone 1 has installed a mobile phone browser and is capable of displaying images. The mobile phone GW 2 is provided by telephone companies and enables the mobile phone 1 to connect to the Internet, private line services, and so on.

The web service system 6 includes a web server 3 on which applications can operate, a database (referred to as a DB hereafter) 5 that stores data required for web services, such as information on connectable devices and access authorization data, and an image database (referred to as an image DB hereafter) 4 that stores original images to be displayed on the mobile phone 1.

The mobile phone browser of the mobile phone 1 implements HTTP (HyperText Transfer Protocol) operable on TCP/IP (Transmission Control Protocol/Internet Protocol). The browser enables connection to the web server 3 and content display through the mobile phone GW 2.

Figure 2:
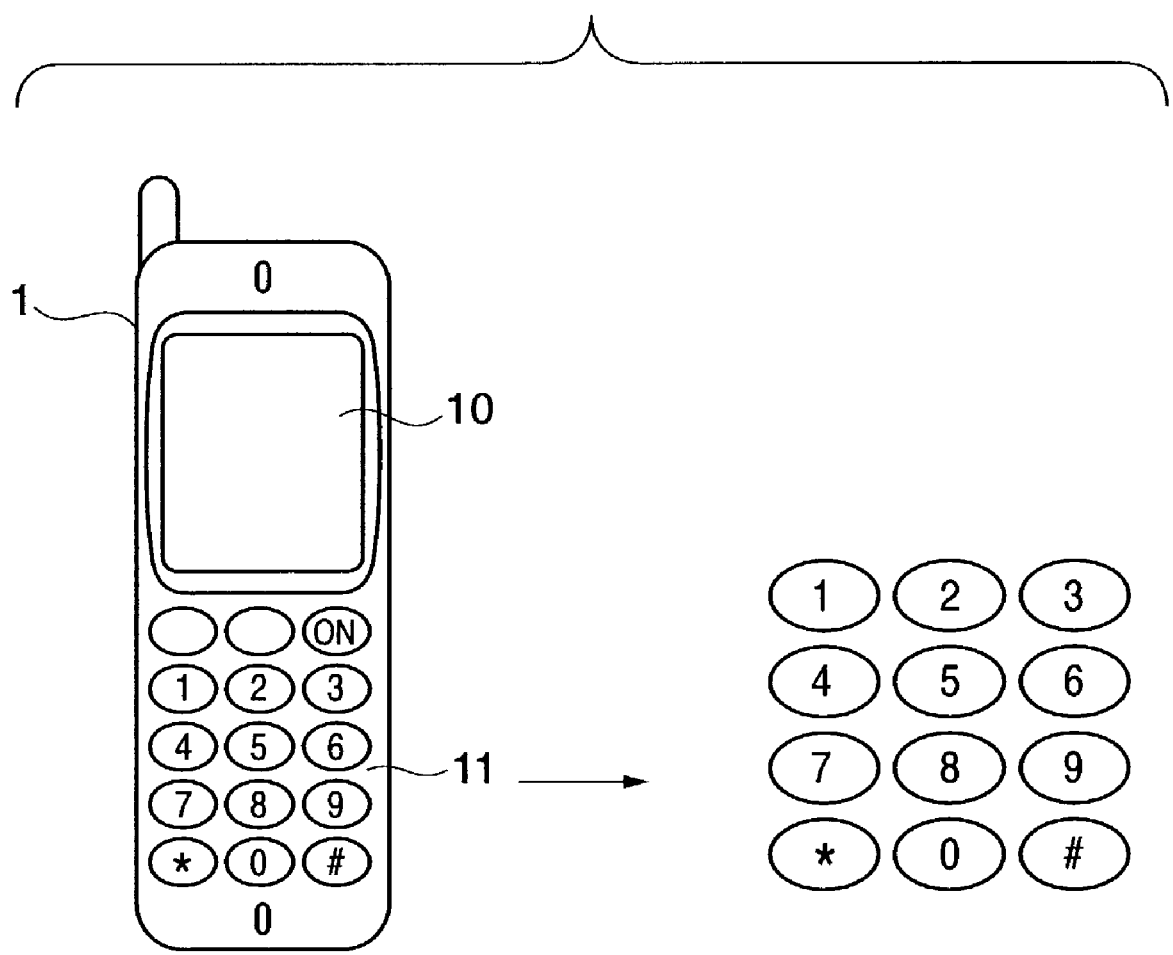
FIG. 2 shows a mobile phone and a ten-key unit used in describing the embodiment of the invention.

FIG. 2 schematically shows the mobile phone 1.

The mobile phone 1 has a display screen 10 capable of displaying information provided by the browser, and an alphanumeric ten-key unit 11 used for inputs of phone numbers, e-mail addresses, e-mail texts, and so on. The ten-key unit 11 includes minimum numeric keys 1 to 0 required for making calls, as well as pound and asterisk keys.

Figure 3:
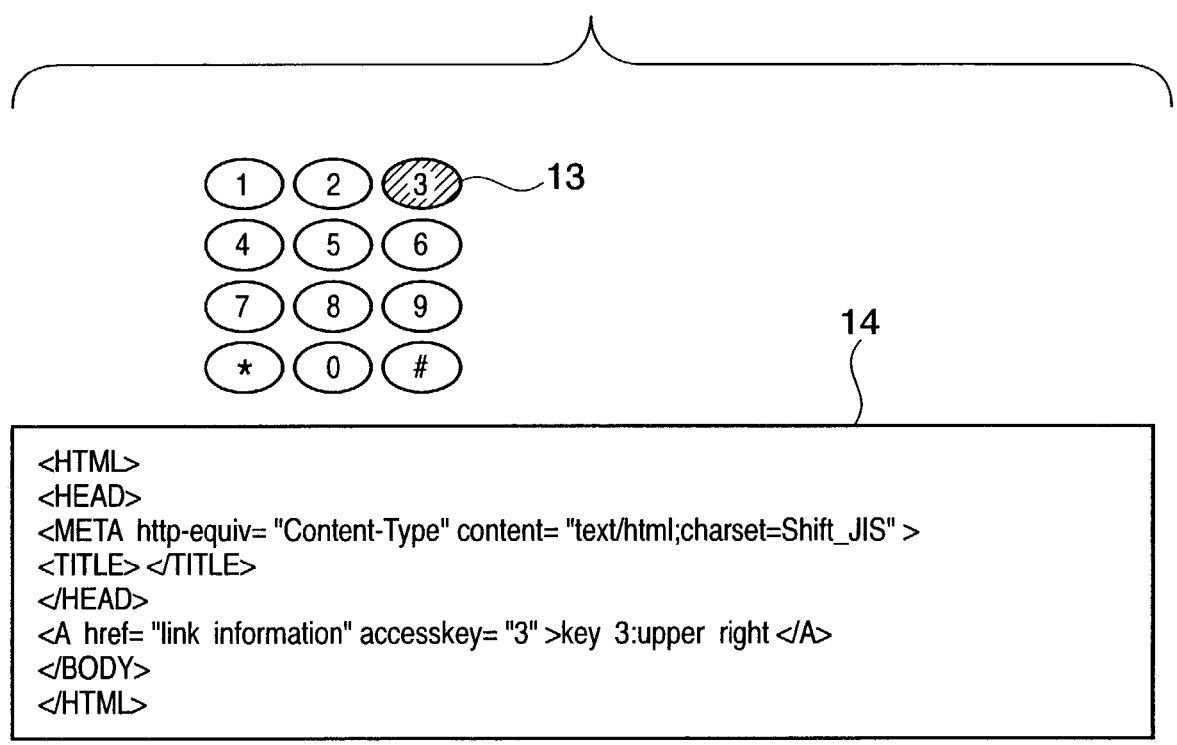
FIG. 3 describes a relationship between an accesskey attribute in HTML and ten-keys for describing the embodiment of the invention.

FIG. 3 describes a relationship between HTML and the ten-keys.

In the above-described HTML called COMPACT-HTML, an attribute called accesskey is available to reduce key operations on a device such as a mobile phone or a PDA (Personal Digital Assistant) used in a mobile environment. In COMPACT-HTML, describing the accesskey attribute in an available tag allows an operation for the tag to be performed simply with a press of a ten-key of a designated number.

An example of how to describe this will be described with the ten-keys 11 and a sample COMPACT-HTML 14.

When it is desired to jump to (select and display) a certain link destination, the accesskey attribute and a ten-key number to be designated may be described in the anchor tag for link information, <A HREF="link information">. As shown in FIG. 3, if the ten-key number to be used as an access key is "3" and the link destination is "link information", the tag is described as <A HREF="link information" ACCESSKEY="3">.

In this manner, while the HTML page is displayed, a press of the key 3 in the ten-keys 11 provides a jump to the link information assigned to the access key "3".

By such a simple description, a press of a key can replace operations that would be performed for a browser operated on PC, such as the key operations of moving a cursor to a link and selecting it with a return key, or the mouse operations of selecting and clicking a link. Therefore, this is a convenient function for small devices with poor input interfaces.

How to actually use the access key in this embodiment will be described with reference to FIG. 4 and the following figures.

Figure 4:
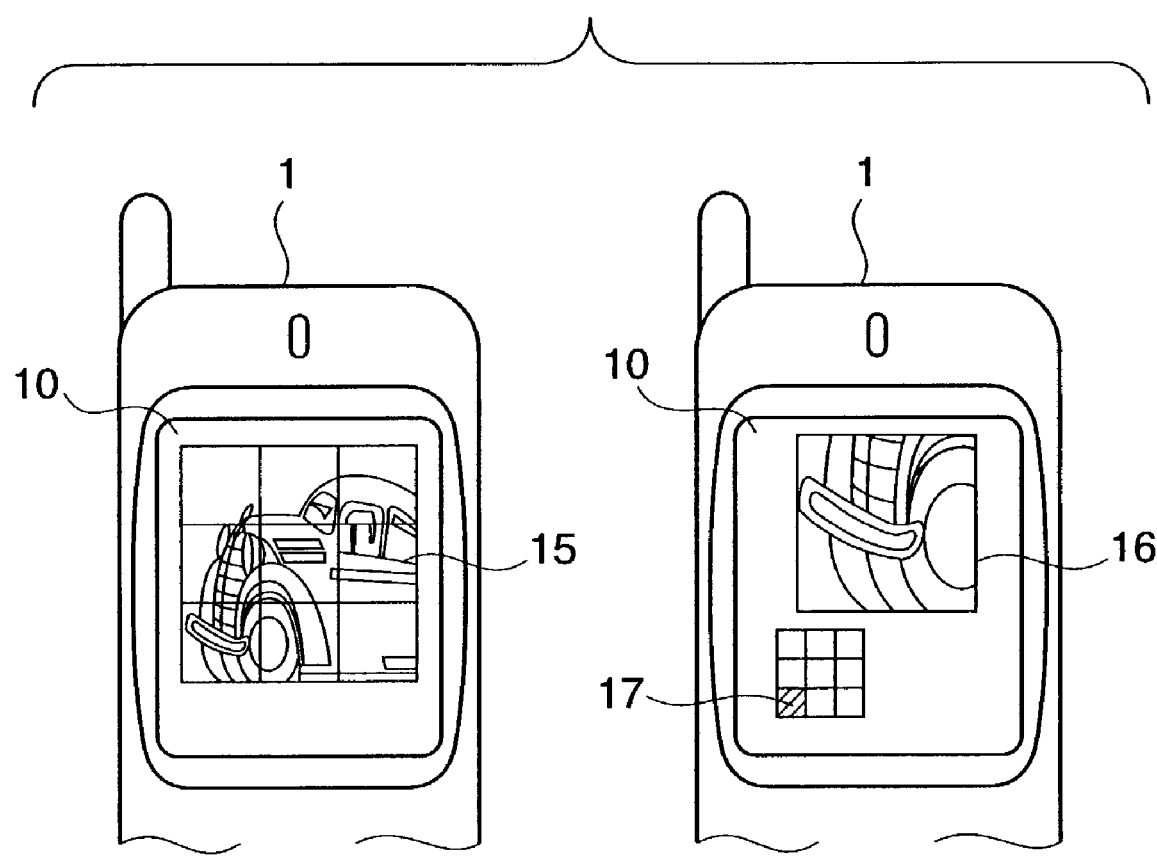
FIG. 4 shows examples of image display on the mobile phone in the embodiment of the invention.

FIG. 4 shows the display screen 10 of the mobile phone 1 displaying an exemplary image 15 obtained by reducing an original image so that it fits into the screen. FIG. 4 also shows the display screen 10 displaying an exemplary image 16 obtained by enlarging a part of the reduced image 15 when the reduced image 15 is hard to view due to its minuteness or blurriness.

In a service that offers image selection and display, an image may be adapted for devices marketed by various companies. However, because of constraints such as the display ability and display size of a screen, simply reducing the image size or subtracting colors from the image may introduce blurriness or other defects into the displayed image and make the image unacceptable. This embodiment provides an enlarged display of a part of an image as desired by a user and enables the user to know the details of the image on a small screen.

However, when an enlarged partial image is displayed on a screen of a limited size, it is hard to know which part is being displayed and how to specify a part to be displayed next. Therefore, this embodiment provides a radar display 17 displayed along with the partial image for indicating which part of an original image is the displayed enlarged image.

The radar display will be described with reference to FIGS. 4, 5, and 6.

Figure 5:
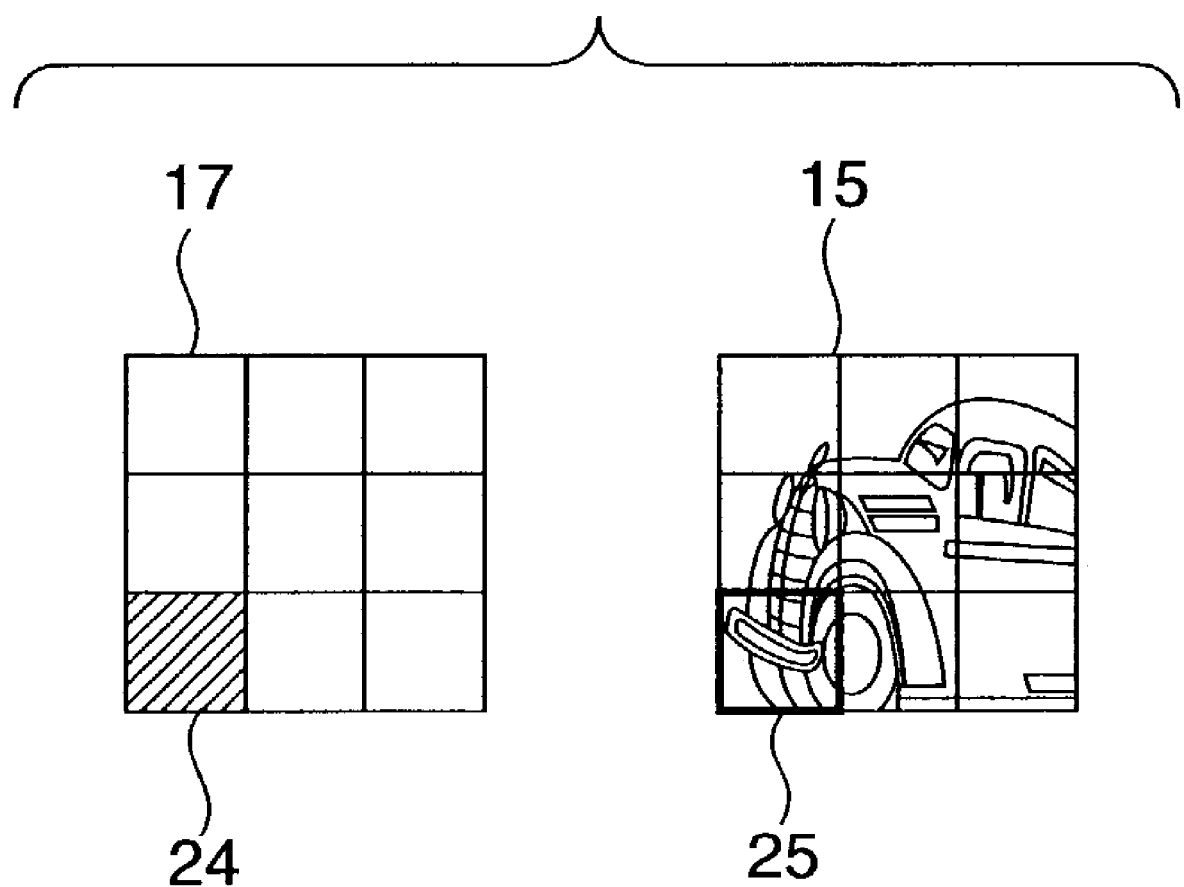
FIG. 5 shows a radar image indicating an enlarged part in the embodiment of the invention.

As shown in FIGS. 4 and 5, the display screen 10 of the mobile phone 1 displays the small radar image 17 on the same page (the same HTML document) as the partial image 16. In the description of this embodiment, a displayed part 25 in the original whole image 15 is recognized in the grid radar image 17, in which a corresponding block 24 is marked (in this example, blacked out) and other blocks remain white so that the displayed part 25 can be distinguished from other parts.

Figure 6:
FIG. 6 shows relationships between radar images and the ten-keys in the embodiment of the invention.
Figure 6:
Figure 6:
Figure 6:
Figure 6:
Figure 6:
Figure 6:
Figure 6:
Figure 6:

FIG. 6 shows radar images and key numbers for selecting images to be displayed next except a currently displayed image while a corresponding radar display is displayed.

A radar image 26-1 in FIG. 6, for example, is displayed along with a partial image corresponding to the key "1" if the key "1" in the ten-keys 11 is pressed in a precedent stage (or if an enlarged version of the upper-left partial image is to be displayed by a default setting). Similarly, a radar display 26-2 is displayed if the key "2" is pressed; a radar display 26-3 is displayed if the key "3" is pressed; a radar display 26-4 is displayed if the key "4" is pressed; a radar display 26-5 is displayed if the key "5" is pressed; a radar display 26-6 is displayed if the key "6" is pressed; a radar display 26-7 is displayed if the key "7" is pressed; a radar display 26-8 is displayed if the key "8" is pressed; and a radar display 26-9 is displayed if the key "9" is pressed.

That is, if an enlarged partial image and its corresponding radar display have been displayed and a key without a positional correspondence with the displayed partial image is pressed (for example, if one of the keys except the key "1" (i.e., the keys "2" to "9") is pressed while the radar display 26-1 is displayed), a partial image having a positional correspondence with the pressed key is selected and displayed along with its corresponding radar display. If a key having a positional correspondence with the displayed partial image is pressed (for example, if the key "1" is pressed while the radar display 26-1 is displayed), the whole image is displayed. Of course, if the whole image has been displayed and one of the keys "1" to "9" is pressed, an enlarged partial image having a positional correspondence with the pressed key is displayed.

Figure 7:
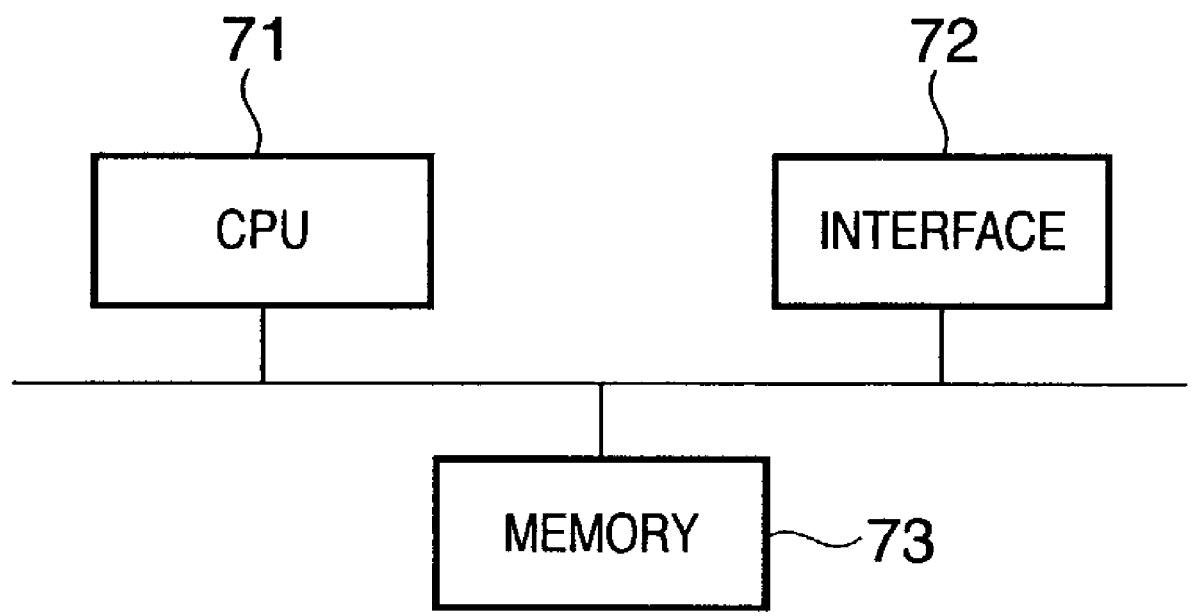
FIG. 7 shows a configuration of a web server in the embodiment of the invention.

FIG. 7 shows a hardware configuration of the web server 3. The web server 3 has a CPU 71, an interface 72, and memory 73. The CPU 71 is a computer that operates according to a program stored in the memory 73. The interface 72 communicates with the mobile phone GW 2 and the DBs 4 and 5.

Now the process flow will be described.

Figure 8:
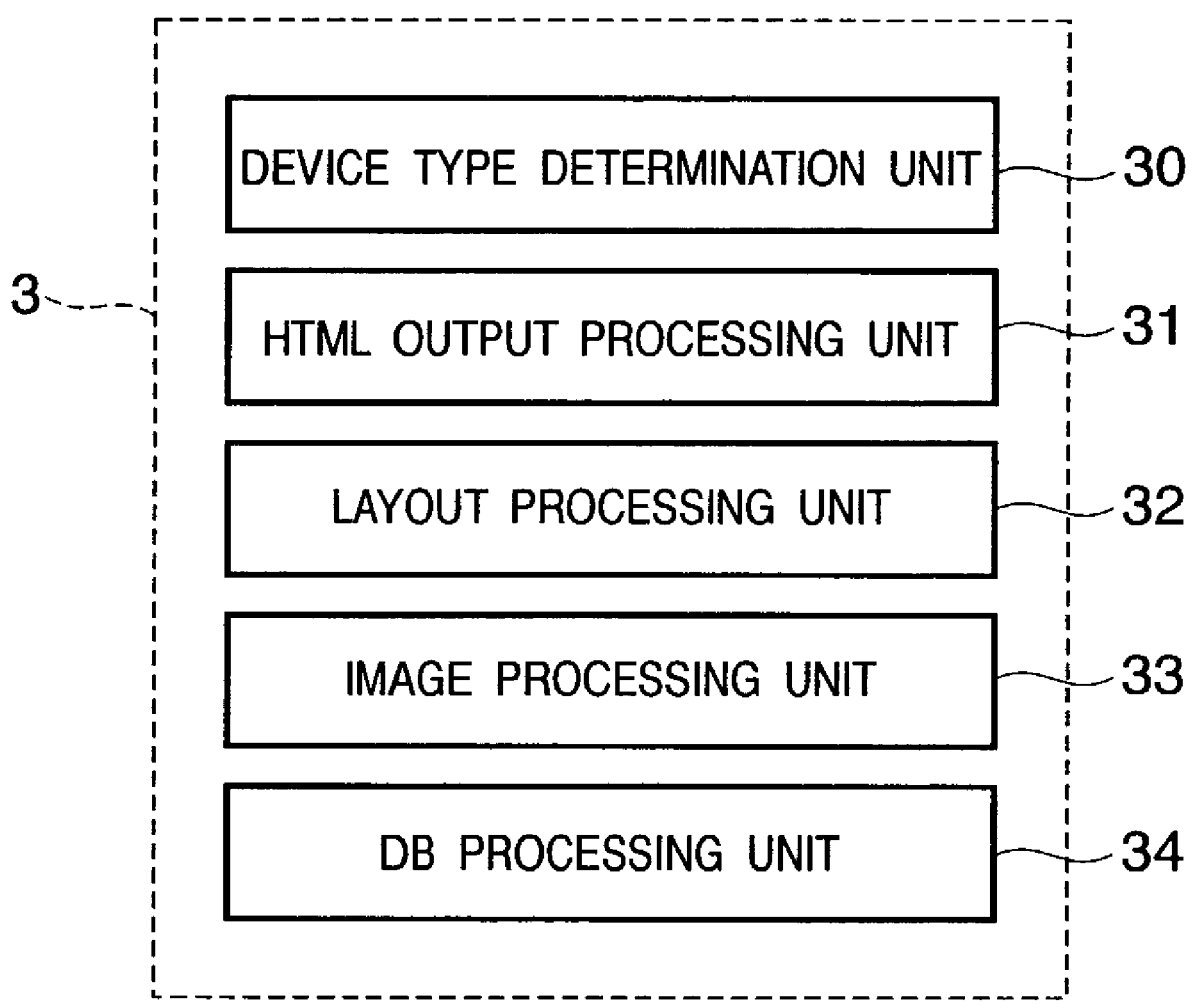
FIG. 8 shows a software configuration of the web server in the embodiment of the invention.

FIG. 8 shows a configuration of software (the program in the memory 73) in the web server 3 of the web service system 6.

Like PC browsers, browsers installed in mobile devices or the like have User-Agent information. When a mobile phone connects to the server, the server receives the User-Agent information from the mobile phone and obtains information about which type of device (or its browser) is connecting. Then, based on the obtained User-Agent information, the server determines the screen size or image format that allows for display on a display screen of the connecting mobile phone. The server also stores the obtained information as customizable information in the DB 5 and customizes the size of an image to be displayed. For example, the server uses the information to scale the image so that its size does not exceed the screen size that allows for display on the display screen of the mobile phone.

Specifically, when the mobile phone 1 connects to the web server 3, a device type determination unit 30 obtains device type information from the User-Agent information sent from the mobile phone. Then, a layout processing unit 32 retrieves the size of the display screen of the connecting mobile phone 1 from information stored in the DB 5 through a DB processing unit 34. The layout processing unit 32 determines whether the size of an original image to be displayed on the mobile phone 1 matches the size of the display screen of the determined device type.

If it does not match, HTML data is generated for displaying an enlarged partial image on the mobile phone 1 as a default image (in this embodiment, an enlarged partial image having a positional correspondence with the key "1" is displayed as the default image). In particular, an image processing unit 33 extracts a partial image corresponding to the key "1" in the ten-keys 11 from the original image. The layout processing unit 32 scales the extracted partial image to the size of the display screen 10 of the mobile phone 1 and obtains a radar image to be displayed along with the partial image from the image DB 4 through the DB processing unit 34. The layout processing unit 32 then generates the HTML data including appropriate access keys and provides it for the mobile phone 1 through an HTML output unit 31.

On the mobile phone 1, the partial image and the radar display are displayed based on the HTML provided by the web server 3. Then, the access keys may be used to display a next partial image or the whole image.

Figure 9:
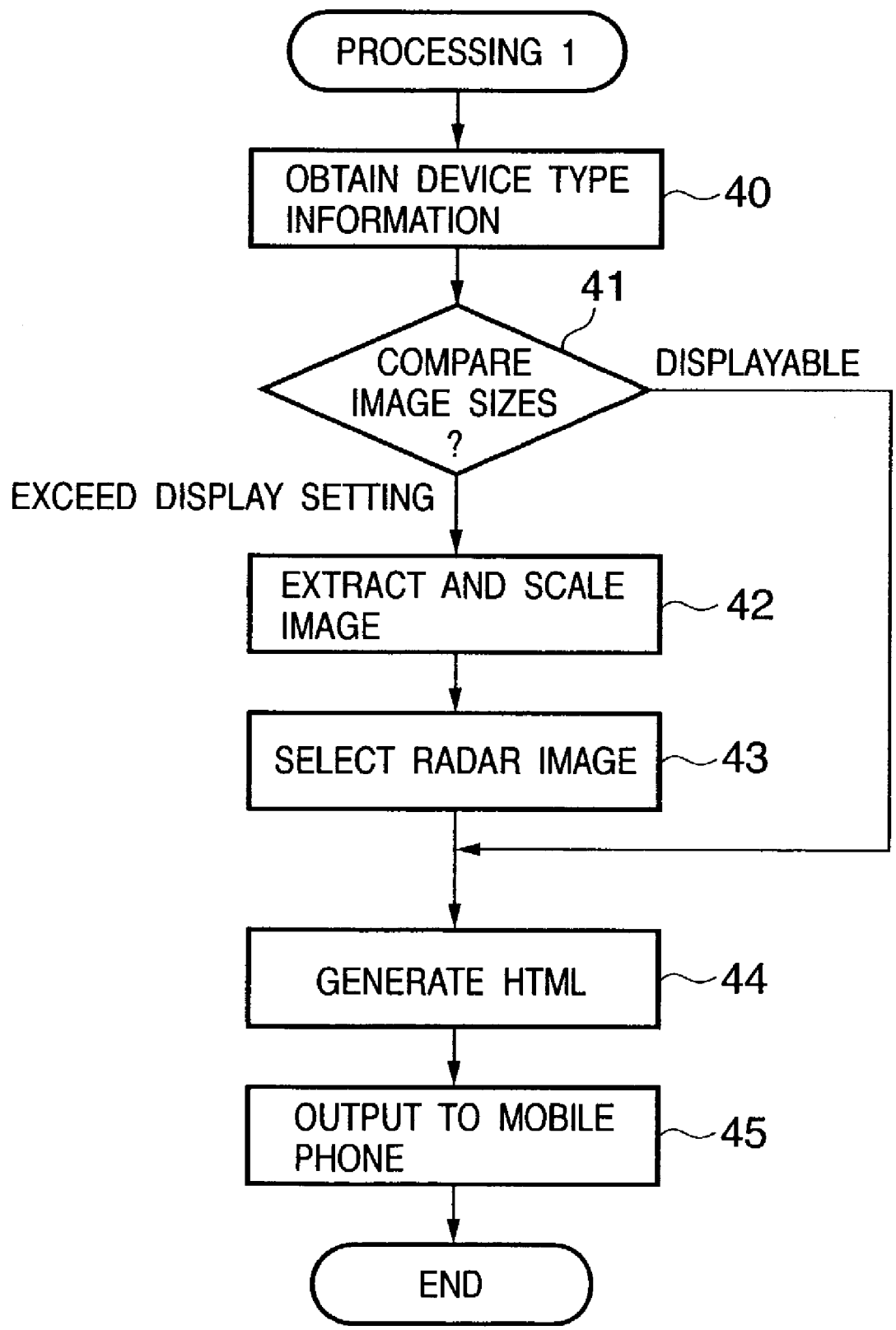
FIG. 9 is a flowchart of an operation performed by the web server in the embodiment of the invention.

The process in FIG. 8 will be described using a flowchart of FIG. 9. This flowchart represents a part of the program stored in the memory 73.

Processing 1 starts with access initiated by a mobile device such as the mobile phone 1.

In step 40, the device type determination unit 30 determines the device type of the accessing mobile phone 1. In step 41, based on the device type information, the layout processing unit 32 performs comparison with the image size suitable for display.

If the comparison in step 41 shows that the size of an original image in the DB 4 can be directly applied to the display screen of the mobile phone 1 (that is, if the original image is of the same size as or smaller than the display screen of the mobile phone 1), the process directly proceeds to step 44. In step 44, HTML data is generated for displaying the original image without modification. The generated HTML data is output to the mobile phone through the HTML output processing unit 31 (step 45). If the original image is larger than the display screen of the mobile phone 1 but can fit into the display screen with predetermined reduction in size (for example, a reduction percentage of 30% or more), it is reduced by that percentage.

Here, the HTML data is generated so that the radar display is not displayed, because the whole of the original image is to be displayed on the mobile phone 1. While the whole image is displayed, the user may select any of the ten-keys from "1" to "9" to transition to an enlarged display of a partial image.

If the comparison in step 41 shows that the original image is larger than the display area of the mobile phone 1 and would require a significant reduction to fit into the display area (for example, a reduction percentage of less than 30%), the default partial image is displayed. In particular, in step 42, an appropriate partial image (in this embodiment, the upper-left part corresponding to the key "1" of the original image divided into nine parts) is extracted from the original image. The extracted partial image is scaled to fit into the display screen of the mobile phone 1 of the determined device type. In step 43, a radar image corresponding to the partial image to be displayed is selected. In step 44, HTML data is generated for displaying the partial image and the radar image on the mobile phone 1. In step 45, the HTML data is output to the mobile phone to be displayed on the mobile phone 1.

Figure 10:
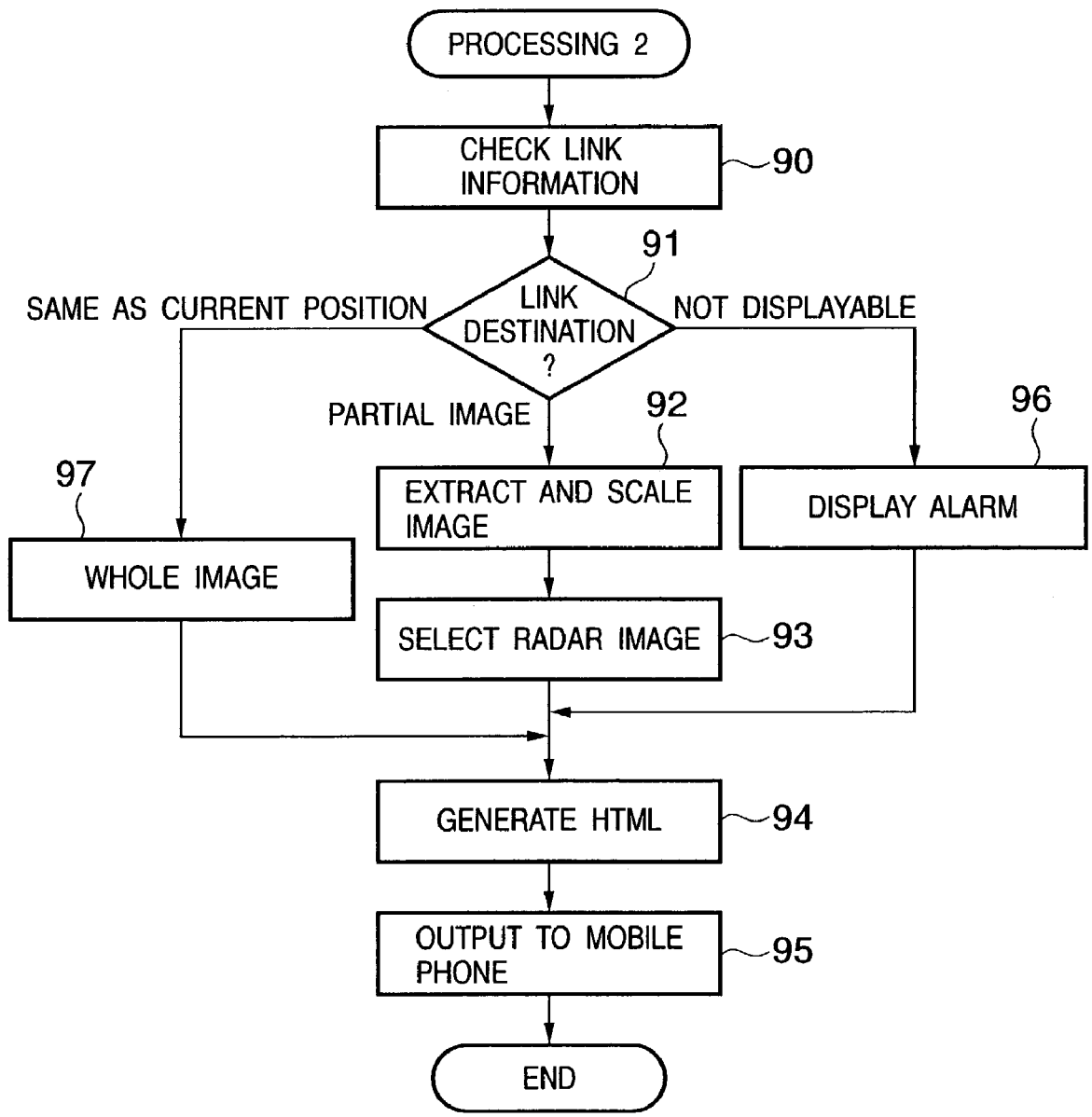
FIG. 10 is a flowchart of an operation performed by the web server in the embodiment of the invention.

FIG. 10 describes processing performed by the web server 3 when a ten-key is pressed while a partial image or the whole image is displayed on the display screen of the mobile phone 1. This flowchart represents a part of the program stored in the memory 73.

When a certain ten-key is pressed on the mobile phone 1, information on a link destination assigned to the pressed ten-key is sent to the web server 3. The web server 3 checks the link information (step 90).

If the key pressed on the mobile phone 1 is a key having a positional correspondence with the currently displayed partial image, the link destination for the link information checked in step 90 is the original whole image. Therefore, the whole image is reduced to fit into the display screen 10 (step 97), HTML data is generated for displaying the reduced whole image (step 94), and the generated HTML data is output to the mobile phone 1 (step 95). Thus, the whole image is displayed on the mobile phone 1.

If the pressed key is a key that are not assigned for display of the partial images or the whole image, such as the key "0", pound (#), or asterisk (*), no image corresponds to a link destination for the link information checked in step 90. Therefore, an alarm message is generated in step 96, and HTML data is generated for displaying the alarm message along with the currently displayed image in step 94 and output to the mobile phone 1 (step 95). Thus, the alarm message is displayed on the mobile phone 1 along with the same image as displayed before the key is pressed. Here, if a partial image has been displayed on the mobile phone 1, then the partial image, the radar display, and the alarm message are displayed. If the whole image has been displayed, then the whole image and the alarm message are displayed.

If a key corresponding to a white part of the radar display is pressed while a partial image and its radar display are displayed, a partial image corresponding to the link destination for the link information checked in step 90 is extracted from the original image in step 92. Then, the partial image is scaled in step 92 so that the partial image and its radar display are displayed on the display screen 10. In step 93, the corresponding radar image is selected. Then, in step 94, HTML data is generated for displaying the partial image and the radar display on the display screen of the mobile phone 1, and output to the mobile phone 1 (step 95). Thus, the partial image for the specified part is displayed on the mobile phone 1 along with the radar image indicating which part of the original image is that partial image.

Thus, according to this embodiment, information is displayed for indicating which part of the whole image is being displayed. This can facilitate recognition of a positional relationship between the displayed image and the whole image.

Further, a radar display as described above is used to display the information for indicating which part of the whole image is being displayed. This can facilitate visual and intuitive recognition of a positional relationship between the displayed image and the whole image.

Further, the radar display is not displayed while the whole image is displayed. This can facilitate recognition that a displayed image is the whole image.

Furthermore, the present invention can be applied to the system comprising either a plurality of units or a single unit. It is needless to say that the present invention can be applied to the case which can be attained by supplying programs which execute the process defined by the present system or invention.

As many apparently widely different embodiments of the present invention can be made without departing from the spirit and scope thereof, it is to be understood that the invention is not limited to the specific embodiments thereof except as defined in the claims.

What is claimed is:

1. An information processing system for providing contents to be displayed on a communication apparatus, comprising:
    storage means for storing an original image;
    first data generating means for generating first data for displaying said original image on the communication apparatus, wherein said first data describes an association between link information of a plurality of partial images, obtained by non-recursively dividing the original image, and keys of the communication apparatus so that the relative location of each partial image in the displayed original image corresponds to its respective key of the communication apparatus;
    first output means for outputting the first data to the communication apparatus;
    receiving means for receiving link information from the communication apparatus;
    first acquisition means for acquiring a partial image, corresponding to the link information received by said receiving means, from said storage means;
    second data generating means for generating second data for displaying the partial image acquired by said first acquisition means together with the key position information indicating an area of the original image corresponding to the partial image and indicating selectable keys for designating another one of the partial images to be alternatively displayed, on the communication apparatus; and
    second output means for outputting the second data to the communication apparatus.

2. A system according to claim 1, wherein the key position information is displayed in a color different from that used to display the key corresponding to the received link information.

3. A system according to claim 1, wherein the keys of the communication apparatus include a numeric pad used to input a telephone number.

4. A method for an information processing system for providing contents to be displayed on a communication apparatus, comprising:
    a storage step of storing an original image in a storage means;
    a first data generating step of generating first data for displaying said original image on the communication apparatus, wherein said first data describes an association between link information of a plurality of partial images, obtained by non-recursively dividing the original image, and keys of the communication apparatus so that the relative location of each partial image in the displayed original image corresponds to its respective key of the communication apparatus;
    a first output step of outputting the first data to the communication apparatus;
    a receiving step of receiving link information from the communication apparatus;
    a first acquisition step of acquiring a partial image, corresponding to the link information received by said receiving step, from said storage means;
    a second data generating step of generating second data for displaying the partial image acquired by said first acquisition step together with the key position information indicating an area of the original image corresponding to the partial image and indicating selectable keys for designating another one of the partial images to be alternatively displayed, on the communication apparatus; and
    a second output step of outputting the second data to the communication apparatus.

5. A method according to claim 4, wherein the key position information is displayed in a color different from that used to display the key corresponding to the received link information.

6. A method according to claim 4, wherein the keys of the communication apparatus include a numeric pad used to input a telephone number.

7. A computer-readable storage medium on which is stored a computer readable program comprising computer executable code that, when executed by a computer, causes the computer for perform a method for an information processing system for providing contents to be displayed on a communication apparatus, the program comprising computer-executable code to perform the steps of:
    a storage step of storing an original image in a storage means;
    a first data generating step of generating first data for displaying said original image on the communication apparatus, wherein said first data describes an association between link information of a plurality of partial images, obtained by non-recursively dividing the original image, and keys of the communication apparatus so that the relative location of each partial image displayed in the original image corresponds to its respective key of the communication apparatus;
    a first output step of outputting the first data to the communication apparatus;
    a receiving step of receiving link information from the communication apparatus;
    a first acquisition step of acquiring a partial image, corresponding to the link information received by said receiving step, from said storage means;
    a second data generating step of generating second data for displaying the partial image acquired by said first acquisition step together with the key position information indicating an area of the original image corresponding to the partial image and indicating selectable keys for designating another one of the partial images to be alternatively displayed, on the communication apparatus; and
    a second output step of outputting the second data to the communication apparatus.

8. A computer-readable medium according to claim 7, wherein the key position information is displayed in a color different from that used to display the key corresponding to the received link information.

9. A computer-readable medium according to claim 7, wherein the keys of the communication apparatus include a numeric pad used to input a telephone number.

* * * * *

UNITED STATES PATENT AND TRADEMARK OFFICE
CERTIFICATE OF CORRECTION

PATENT NO.        : 7,251,774 B2                                      Page 1 of 1
APPLICATION NO. : 10/385459
DATED             : July 31, 2007
INVENTOR(S)       : Jin Sunata It is certified that error appears in the above-identified patent and that said Letters Patent is hereby corrected as shown below:

COLUMN 1:
Line 63, "comprising selection" should read -- comprises selection --.

COLUMN 2:
Line 2, "comprising the steps of" should read -- comprises the steps of --; and
Line 8, "comprising the steps of" should read -- comprises the steps of --.

COLUMN 5:
Line 41, "performs comparison" should read -- performs a comparison --.

COLUMN 6:
Line 29, "are" should read -- is --.

COLUMN 8:
Line 26, "for perform" should read -- to perform --.

Signed and Sealed this

Twenty-fourth Day of June, 2008

JON W. DUDAS
*Director of the United States Patent and Trademark Office*